March 23, 1948. E. A. STALKER 2,438,254
AIRCRAFT
Filed Aug. 20, 1943
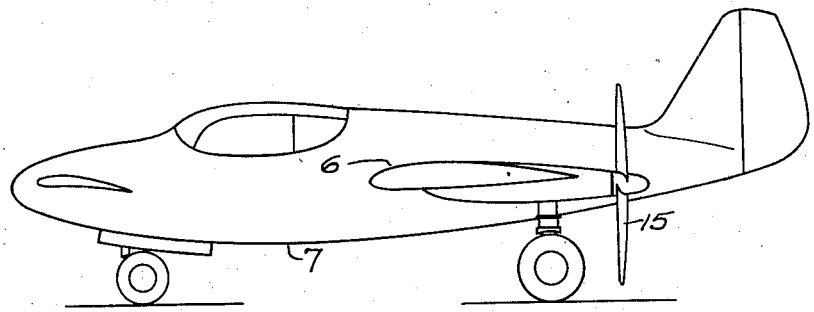
Fig 1
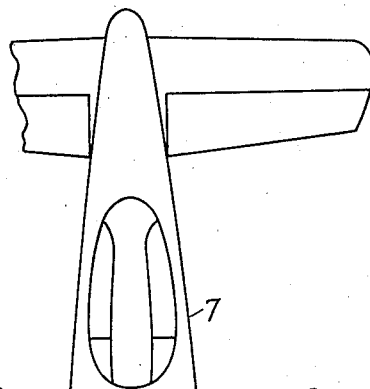
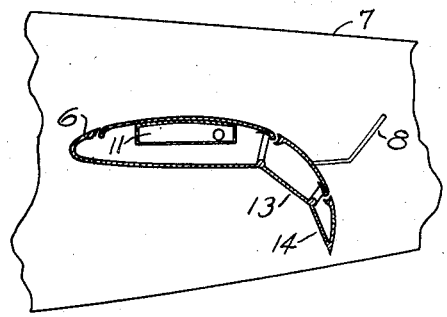
Fig 3
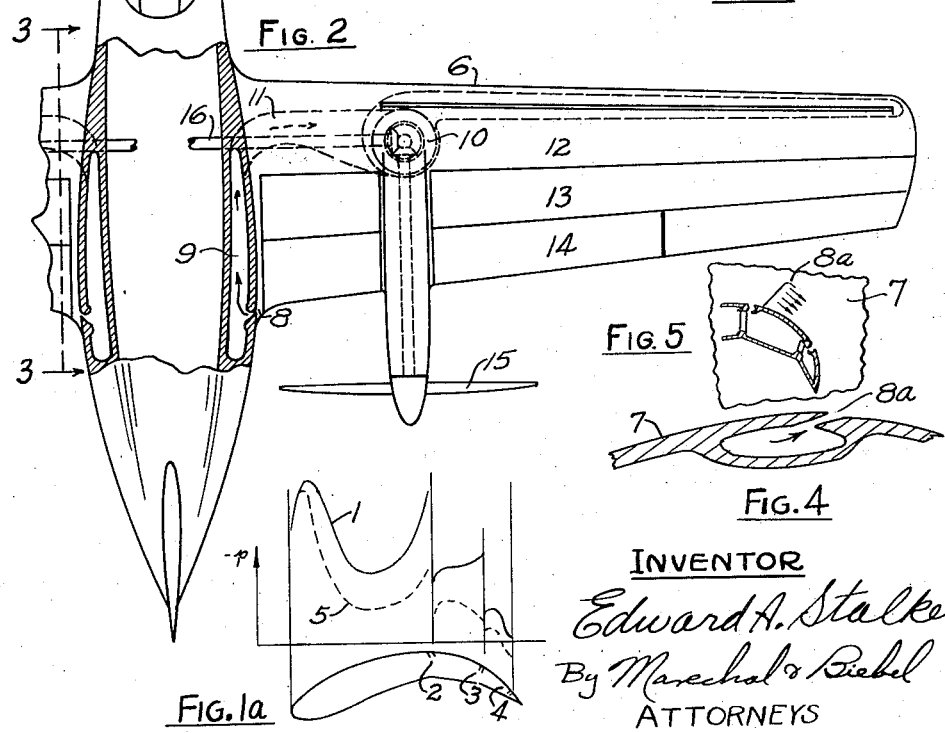
INVENTOR
Edward A. Stalker
By Marechal & Biebel
ATTORNEYS Patented Mar. 23, 1948

2,438,254

UNITED STATES PATENT OFFICE 2,438,254

AIRCRAFT

Edward A. Stalker, Bay City, Mich.

Application August 20, 1943, Serial No. 499,391

6 Claims. (Cl. 244—42)

My invention relates to airplanes and particularly to a combination of a fuselage and wing. It has for its principal object to provide a combined fuselage and wing construction which favors the maintenance of a highly curved smooth flow of air over the wing section near the root of the wing so that a high lift may be developed from a highly cambered wing while avoiding objectionable loss of energy of the flow over the wing surface by reason of the retardation of the flow usually produced by the sides of the fuselage.

It is also an object to provide a suitably shaped end shield for the wing such as the side of the fuselage over which the velocity of the flow is increased so that high lift of the wing is maintained throughout and even closely adjacent the fuselage.

Other objects and advantages will appear from the following description, the accompanying drawings, and the appended claims.

Referring to the drawings which illustrate a preferred embodiment of the invention—

Fig. 1 is a side elevational view of an aircraft constructed in accordance with the present invention;

Fig. 1a is a diagrammatic representation of the pressure distribution over the wing construction of this invention;

Fig. 2 is a fragmentary top plan of the aircraft, partly in section;

Fig. 3 is a vertical section along line 3—3 of Fig. 2 with the flaps depressed;

Figs. 4 and 5 are fragmentary views respectively in section and in side elevation of the fuselage showing a modified form of slot.

When highly cambered wings equipped with slots to provide high lift coefficients by boundary layer control are combined with a fuselage there is usually a serious loss of lift on the portion of the wing adjacent the fuselage. This results from the retardation of the flow in contact with the sides of the fuselage above the wing, such flow being the same flow as that going over the upper surface of the wing. To make the flow follow a highly cambered wing surface, wing slots are utilized to control the boundary layer. Loss of energy in the flow along the wing will cause the flow to burble and a loss of energy due to the fuselage would have the same effect causing the flow to burble on the wing and reducing the lift coefficient.

Fig. 1a shows the pressure distribution curve 1 over the upper surface of a highly cambered wing having suction slots 2, 3 and 4, this section being taken at a line well removed from the fuselage end of the wing and negative pressure being shown as ordinates. Curve 5 shows the pressure distribution for a section near the fuselage end of the wing and while the curve is generally similar in pattern the reduction in the suction above the wing is very marked as evidenced by the lower suction ordinates.

Fig. 2 shows by way of illustration an aircraft incorporating the present invention. It is shown as the tail first or canard type as with that type it is relatively easy to provide for greater width of the fuselage at the rear portion of the wing than at the front portion. However the invention is not limited to the tail first type but is fully applicable to the conventional nose first type where the proper width relationship of the fuselage is established. Also the invention is applicable to the fuselage or to other forms of end shield construction.

It will be observed that the fuselage wall is curved downstream and outward toward the wing tip forming an end shield for the wing. This constricts the main relative wind and causes a reduction in pressure along the fuselage, this reduction becoming greater in magnitude as the trailing edge of the wing is approached. That is, the suction pulling the flow rearward is progressively greater with increasing distance downstream from the nose of the wing establishing a favorable pressure gradient along the fuselage.

The suction slot 8 in the side of the fuselage 7 also creates a low pressure or suction downstream which favors the continuance of the flow along the wing 6 and fuselage surface. This slot leads into the compartment 9 extending lengthwise of the fuselage which is in communication with the inlet of the blower 10 by means of duct 11. This blower inlet is also in communication with the slots 2, 3 and 4 in the wing flaps 13 and 14. Suitable controls are provided for adjusting the flaps relative to the wing main body 12 from a raised high speed position such as shown in Fig. 1 to a lowered high lift position forming a highly cambered wing surface as shown in Fig. 3.

The blowers 10 and propellers 15 on each side of the aircraft are driven by the shafts 16 from the power source through suitable gear trains.

Air is inducted through the upper surface slots 2, 3 and 4 and likewise through the fuselage slot 8 at substantially the trailing edge of the wing. Slot 8 is preferably shaped as shown in Fig. 3 so that as the flap is raised the lower portion of the slots is covered by the flap.

As an alternative construction, the discharge from the blower may be utilized to establish a flow through a discharge slot, Figs. 4 and 5 showing a discharge slot 8a which is connected by means of a suitable duct to the discharge side of the blower to discharge fluid rearward along the fuselage surface above the wing. It may be located forwardly of slot 8 such as the position shown in Fig. 5 or even further forward. Such duct communicates with the blower discharge and thus a rearwardly directed jet is provided which develops a forward propulsive thrust and likewise imparts additional energy to the surface layer of air immediately adjacent the fuselage.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In combination to form a wing, a wing main body, a flap, means to support said flap on said body for adjustment to a lowered high lift position forming a highly cambered wing surface, a fuselage supported by the wing, the width of the fuselage at the wing rear portion being greater than the width at the wing front portion and progressively increasing rearwardly between said portions to create a favorable pressure gradient along the fuselage above the wing to preserve the lift of the wing portion adjacent the side surface of said fuselage, said side surface having a slot therein adjacent said rear portion of the wing, and means to induce a flow through said slot to augment said favorable pressure gradient.

2. In combination to form a wing, a wing main body, a flap, means to support said flap on said body for adjustment to a lowered high lift position forming a highly cambered wing surface, a fuselage supported by the wing, the width of the fuselage at the wing rear portion being greater than the width at the wing front portion and progressively increasing rearwardly between said portions to create a favorable pressure gradient along the fuselage above the wing to preserve the lift of the wing portion adjacent the side surface of said fuselage, said side surface having a slot therein at substantially the trailing edge of said flap, and means to induce a flow through said slot to augment said favorable pressure gradient.

3. In combination to form a wing, a wing main body, a flap, means to support said flap on said body for adjustment from a raised high speed position to a lowered high lift position forming a highly cambered wing surface, an end shield supported by said wing, the width of the end shield at the wing rear portion being greater than the width at the wing front portion and progressively increasing rearwardly between said portions to create a favorable pressure gradient along said shield above the wing to preserve the lift of the wing portion adjacent the side surface of said end shield, said side surface having a slot therein adjacent said rear portion of the wing, and means to induce a flow through said slot to augment said favorable pressure gradient.

4. In combination in an aircraft, a wing having an adjustable flap, means to adjust said flap from a raised high speed position to a lowered high lift position forming a highly cambered wing surface, said wing having a slot in its upper surface, means to induce a flow through said slot to control the boundary layer for lift augmentation, a fuselage supported by said wing, means forming a slot in said fuselage adjacent said flap, and means to induce a flow through said fuselage slot tending to oppose a reversal of flow over the surface of said fuselage above said wing and the wing upper surface adjacent thereto.

5. In combination, a wing having an adjustable flap, means to adjust said flap from a raised high speed position to a lowered high lift position forming a highly cambered wing surface, a fuselage supported by the wing, said fuselage having a slot in its side surface adjacent the upper surface of said wing ahead of the trailing edge thereof, and power operated means to discharge a rearwardly directed jet flow through said slot to impart additional energy to the surface layer of air immediately adjacent the fuselage surface above said flap.

6. In combination in an aircraft, a wing having an adjustable flap, means to adjust said flap from a raised high speed to a lowered high lift position forming a highly cambered wing surface, a fuselage supported by said wing, means forming a slot in said fuselage adjacent said flap in both the raised and lowered positions thereof, and means for inducing a flow through said fuselage slot to control the boundary layer on said fuselage adjacent said wing, said slot having substantial extent providing for cooperation thereof with the surface of said wing in variable positions of said flap to increase the lift coefficient of the portion of said wing adjacent said fuselage in different flap positions.

EDWARD A. STALKER.

REFERENCES CITED

The following references are of record in the file of this patent:

UNITED STATES PATENTS

| Number | Name | Date |
| --- | --- | --- |
| 1,427,872 | Verville | Sept. 5, 1922 |
| 1,704,831 | Herbert | Mar. 12, 1929 |
| 2,041,791 | Stalker | May 26, 1936 |
| 2,165,482 | Hovgard | July 11, 1939 |
| 2,274,442 | Woods | Feb. 24, 1942 |
| 1,725,724 | Thomas | Aug. 20, 1929 |

FOREIGN PATENTS

| Number | Country | Date |
| --- | --- | --- |
| 209,435 | Great Britain | Nov. 27, 1924 |
| 504,747 | Great Britain | May 1, 1939 |